United States Patent
Cai et al.

(10) Patent No.: US 9,214,042 B2
(45) Date of Patent: Dec. 15, 2015

(54) METHOD FOR ENCODING NORMALS OF A 3D MESH MODEL, METHOD FOR DECODING NORMALS OF A 3D MESH MODEL, ENCODER AND DECODER

(75) Inventors: Kang Ying Cai, Beijing (CN); Wei Wei Li, Beijing (CN); Zhi Bo Chen, Beijing (CN)

(73) Assignee: THOMSON LICENSING, Issy les Moulineaux (FR)

(*) Notice: Subject to any disclaimer, the term of this patent is extended or adjusted under 35 U.S.C. 154(b) by 246 days.

(21) Appl. No.: 13/575,228

(22) PCT Filed: Jan. 25, 2010

(86) PCT No.: PCT/CN2010/000109
§ 371 (c)(1), (2), (4) Date: Jul. 25, 2012

(87) PCT Pub. No.: WO2011/088595
PCT Pub. Date: Jul. 28, 2011

(65) Prior Publication Data
US 2012/0306875 A1   Dec. 6, 2012

(51) Int. Cl.
*G06T 17/00* (2006.01)
*G06T 17/20* (2006.01)
(Continued)

(52) U.S. Cl.
CPC .............. *G06T 17/20* (2013.01); *G06T 9/001* (2013.01); *G06T 9/004* (2013.01); *G06T 9/008* (2013.01); *G06T 15/50* (2013.01); *G06T 17/205* (2013.01)

(58) Field of Classification Search
CPC ....... G06T 17/20; G06T 17/00; G06T 17/205; G06T 9/001; G06T 15/50
See application file for complete search history.

(56) References Cited

U.S. PATENT DOCUMENTS 5,734,385 A   3/1998   Mima et al.
5,793,371 A   8/1998   Dearing
(Continued)

FOREIGN PATENT DOCUMENTS

CN   101408990   4/2009
EP   0448802   10/1991
(Continued)

OTHER PUBLICATIONS

Deok-Soo Kim et al, "Normal vector compression of 3D mesh model based on clustering and relative indexing", Future Generation Computer Systems 20 (2004) 1241-1250, http://www.sciencedirect.com/science/article/pii/S0167739X04000925.*

(Continued)

*Primary Examiner* — Tize Ma
(74) *Attorney, Agent, or Firm* — Tutunjian & Bitetto, P.C.

(57) ABSTRACT

A method for encoding vertex orientations, also known as normal components, of a 3D mesh model comprises a first clustering of the normal components, determining for each of the first clusters a sphere sector to which most of its elements belong, mapping normal components to a predefined sector, re-clustering the normal components in the predefined sector into second clusters, determining predictors for the second clusters and encoding a normal component by its residual, a reference to its predictor and data indicating which of said mirror mapping operations were performed. A sphere sector is obtained by dividing a sphere into m equal spherical segments and dividing each of said spherical segments into n equal sectors. The first clustering for the sector mapping and the second clustering for predictive coding result in an improved compression ratio.

12 Claims, 5 Drawing Sheets

(51) Int. Cl.
　　　*G06T 9/00*　　　(2006.01)
　　　*G06T 15/50*　　(2011.01)

(56) References Cited

U.S. PATENT DOCUMENTS

| | | | |
|---|---|---|---|
| 6,167,159 | A | 12/2000 | Touma et al. |
| 6,192,150 | B1 | 2/2001 | Leow et al. |
| 6,546,141 | B1 | 4/2003 | Jeong et al. |
| 6,563,500 | B1 | 5/2003 | Kim et al. |
| 6,573,890 | B1 | 6/2003 | Lengyel |
| 6,577,310 | B1 | 6/2003 | Kim et al. |
| 6,606,095 | B1 | 8/2003 | Lengyel et al. |
| 6,614,428 | B1 | 9/2003 | Lengyel |
| 6,668,091 | B1 | 12/2003 | Kim et al. |
| 6,898,320 | B2 | 5/2005 | Han et al. |
| 6,906,714 | B2 | 6/2005 | Grzeszczuk et al. |
| 6,919,889 | B2 | 7/2005 | Grzeszczuk et al. |
| 6,975,755 | B1 | 12/2005 | Baumberg et al. |
| 7,265,752 | B2 | 9/2007 | Sander et al. |
| 8,000,540 | B2 | 8/2011 | Ahn et al. |
| 8,254,705 | B2 | 8/2012 | Ahn et al. |
| 2003/0044073 | A1 | 3/2003 | Matsugu et al. |
| 2003/0086617 | A1 | 5/2003 | Huang |
| 2003/0117392 | A1 | 6/2003 | Young et al. |
| 2003/0234783 | A1 | 12/2003 | Grzeszczuk et al. |
| 2004/0085312 | A1 | 5/2004 | Buchner et al. |
| 2006/0008151 | A1 | 1/2006 | Lin et al. |
| 2007/0109298 | A1 | 5/2007 | Elmieh et al. |
| 2007/0286468 | A1 | 12/2007 | Joshi et al. |
| 2008/0205749 | A1 | 8/2008 | Beaulieu et al. |
| 2009/0074272 | A1 | 3/2009 | Lu et al. |
| 2009/0080747 | A1 | 3/2009 | Lu et al. |
| 2009/0184956 | A1 | 7/2009 | Kim et al. |
| 2010/0111370 | A1 | 5/2010 | Black et al. |

FOREIGN PATENT DOCUMENTS

| | | |
|---|---|---|
| EP | 1232480 | 5/2006 |
| GB | 2355089 | 11/2003 |
| JP | H08221594 | 8/1996 |
| JP | H09171568 | 6/1997 |
| JP | 2000175190 | 6/2000 |
| JP | 2000194843 | 7/2000 |
| JP | 2001022956 | 1/2001 |
| JP | 2005084780 | 3/2005 |
| JP | 2006136020 | 5/2006 |
| WO | WO9934336 | 7/1999 |
| WO | WO2006064478 | 6/2006 |
| WO | WO2009108135 | 9/2009 |

OTHER PUBLICATIONS

Shikhare et al., "Compression of Large 3D Engineering Models using Automatic Discovery of Repeating Geometric Features", 6th International Fall Workshop on Vision, Modeling and Visualization (VMV2001), Nov. 21-23, 2001, Stuttgart, Germany.

Deering et al., "Geometry Compression", in: Proceedings of ACM SIGGRAPH, 1995, pp. 13-20.

Kim et al., "Normal Compression Based on Clustering and Relative Indexing",in: Pacific Conference on Computer Graphics and Applications IEEE, 2002.

Amjoun et al., "Compression of Complex Animated Meshes", Advances in Computer Graphics Lecture Notes in Computer Science, vol. 4035, Jan. 1, 2006, pp. 606-613.

Amjoun et al., "Encoding Animated Meshes in Local Coordinates", International Conference on Cyberworlds, Hannover, Germany, Oct. 24, 2007, pp. 437-446.

Sattler et al., "Simple and Efficient Compression of Animation Sequences", Proceedings of the 2005 ACM, Los Angeles, California, USA, Jul. 29, 2005, pp. 209-217.

Sorkine et al., "High-Pass Quantization for Mesh Encoding" Symposium on Geometry Processing ACM, New York, NY, 2003, pp. 42-51.

Vranic et al., "3D Model Retrieval", Proceedings of the Spring Conference on Computer Graphics and its Applications, May 3, 2009, pp. 89-93.

Cai et al., "Exploiting Repeated Patterns for Efficient Compresssion of Massive Models", Proceedings of the 8th International Conference on Virtual Reality Continuum, Yokohama, Japan, Dec. 14, 2009, pp. 145-150.

Mudur et al., "3D Compression of Engineering Models for Cooperative Computing Applications", International Conference on Infrastructure for E-Business, Jan. 21, 2002, pp. 1-10.

Rungta, "Domain Based Lossless Text Compression-Report", Oct. 18, 2007, pp. 1-8.

Kim et al., "The Compression of the Normal Vectors of 3D Mesh Models Using Clustering", International Conference on Computational Science, Dec. 31, 2002, pp. 275-284.

Gieng et al., "Smooth hierarchical surface triangulations", 1997 IEEE Proceedings of Visualization, Phoenix, Arizona, USA, Oct. 24, 1997, pp. 379-386.

Ouyang et al., "On the normal vector estimation for point cloud data from smooth surfaces", Computer aided design, vol. 37, No. 10, Sep. 1, 2005, pp. 1071-1079.

Chou et al., "Vertex Data Compression through Vector Quantization", IEEE Transactions on Visualization and Computer Graphics, vol. 8, No. 4, Oct.-Dec. 2002, pp. 373-382.

Gumhold et al., "Higher order prediction of geometry compression", Proceedings of the Shape Modeling International 2003, Seoul, Korea, May 12, 2003, pp. 59-66.

Lee et al., "Angle-analyzer : A triangle-quad mesh codec", Eurographics '02 Conference Proceedings, vol. 21, No. 3, (2002), pp. 383-392.

Lee et al., "Vertex data compression for traingular meshes", 2000 Proceedings of 8th Pacific Conference on Computer Graphics and Applications, Hong Kong, Oct. 3, 2000, pp. 225-234.

Devillers et al., "Geometric compression for interactive transmission", IEEE Proceedings on Visualization, 2000, Salt Lake City, Utah, USA, Oct. 13, 2000, pp. 319-326.

Garland et al., "Simplifying Surfaces with Color and Texture using Quadric Error Metrics", IEEE Proceedings on Visualization 1998, Research Triangle Park, North Carolina, USA, Oct. 18, 1998, pp. 263-269.

Peng et al., "Technologies for 3D mesh compression : A survey", Journal of Visual Communication and Image Representation, vol. 16, No. 6, 2005, pp. 688-733.

Rossignac et al., "Edgebreaker: Connectivity compression for triangle meshes", IEEE Transactions on Visualization and Computer Graphics, vol. 5, No. 1, Jan.-Mar. 1999, pp. 47-61.

MacQueen, "Some Methods for classification and Analysis of Multivariate Observations" Proceedings of 5th Berkeley Symposium on Mathematical Statistics and Probability, Berkeley, University of California Press, 1967, vol. 1, pp. 281-297.

Cai et al., "A Single-Pass Approach to Adaptive Simplification of Out-Of-Core Models", International Journal of Image and Graphics, vol. 3, No. 2 (2003), pp. 1-19.

\* cited by examiner a)

b)

c)

METHOD FOR ENCODING NORMALS OF A 3D MESH MODEL, METHOD FOR DECODING NORMALS OF A 3D MESH MODEL, ENCODER AND DECODER

This application claims the benefit, under 35 U.S.C. §365 of International Application PCT/CN2010/000109, filed Jan. 25, 2010, which was published in accordance with PCT Article 21(2) on Jul. 28, 2011 in English.

FIELD OF THE INVENTION

This invention relates to the encoding and decoding of normals of a 3D mesh model. In particular, the invention relates to a method for encoding and a method for decoding such normals, a corresponding encoder and decoder, and an encoded 3D model.

BACKGROUND 3D mesh models are usually composed of triangles, each of which are represented by associated position, colour and normal components. The position is given by floating-point coordinates of its three corners, or vertices. Each vertex has a normal component associated, which is also a floating-point value. The normal component gives the spatial vertex orientation. In compressing such 3D mesh models, each of the position, colour and normal components are separately compressed. [D95][1] describes such compression. In [D95], a normal sphere, on which the end points of unit normals lie, is divided into eight octants and each octant consists of six sextants. Further subdividing a sextant, normals are referenced by the mean of the normal on the 1/48 sphere. However, the approach given in [D95] is only suitable when the model normals are spherically uniform distributed. Based on the observation that normals of 3D mesh models are usually not evenly distributed, [DYH02][2] proposes k-means clustering of normals for improved compression. However, in this approach the number of clusters k is fixed. Moreover, it always a hard task to decide k beforehand. Further, advantages available in [D95], such as the normal encoding parameterization, are not available any more in [DYK02].

Complex 3D mesh models are composed of several components, which are called connected components. These are defined in SBM01[3] as follows. Two polygons are neighbouring polygons if they share an edge. There exists a path between polygons $p_i$ and $p_j$ if there is a sequence of neighbouring polygons. A subset $O_c$ of the mesh model O is called a connected component if there exists a path between any two polygons in $O_c$. Such mesh model is called a multi-connected model. Further, for multi-connected models, an effective compression scheme may discover the repeating features and then compress the transformation data. The orientations are one of the important parts of transformations data.

SUMMARY OF THE INVENTION

In many 3D models, normals are unevenly distributed. Therefore they should be sorted into a variable number of clusters. An efficient normal compression method is desirable for realistic models, including cases where normals are distributed in a variable number of clusters.

The present invention provides an efficient method to compress orientations of connected components of massive 3D engineering models. Our compression method combines the power of mapping operations and clustering, in particular k-means clustering.

In one aspect, a method for encoding vertex orientations, also known as normal components, of a 3D mesh model comprises a first clustering of the normal components, determining for each of the first clusters a sphere sector to which most of its elements belong, mapping normal components to a predefined sector, re-clustering the normal components in the predefined sector into second clusters, determining predictors for the second clusters and encoding a normal component by its residual, a reference to its predictor and data indicating which of said mirror mapping operations were performed. A sphere sector is obtained by dividing a sphere into m equal spherical segments and dividing each of said spherical segments into n equal sectors. The first clustering for the sector mapping and the second clustering for predictive coding result in an improved compression ratio.

In principle, an aspect of the invention is that in encoding normals, a first clustering of the normals is performed, then the clusters are mapped into a predefined sector of the unit sphere, and a second clustering is performed on the result. The purpose of the first clustering is to optimize the mapping operation, and the purpose of the second clustering is to optimize the predicted coding of the normals.

According to one aspect of the invention, a method for encoding normal components of a 3D mesh model, wherein a normal component is definable by its position on a unit sphere, comprises steps of clustering the normal components of the 3D mesh model, wherein one or more first clusters are obtained and each normal component is an element of at least one of said first clusters, determining for each of the first clusters of normal components a sphere sector to which a majority of its elements belong, wherein a sphere sector is obtainable by dividing a sphere into m equal spherical segments and dividing each of said spherical segments into n equal sectors, mapping normal components, which according to the determining are not in a pre-defined of said sectors, into the predefined sector, re-clustering the normal components, wherein one or more second clusters are obtained and each normal component is an element of at least one of said second clusters, quantizing the normal components, determining for each of said second clusters a representative predictor element, determining residuals for the normal components, a residual being the difference between a normal component and its respective predictor element, and encoding a normal component by its residual, a reference to its predictor element and data indicating which of said mirror mapping operations were performed.

Generally, the mapping comprises up to $\text{int}(\log_2(m)+\log_2(n)+1)$ mirror mapping operations.

According to one aspect of the invention, a method for decoding normal components of a 3D mesh model from an encoded bitstream, wherein a normal component is definable by its position on a unit sphere, comprising steps of extracting from the encoded bitstream data of a normal component being a predictor, and extracting an identifier for the predictor, extracting from the encoded bitstream data relating to an encoded normal component, the data comprising residual data, predictor identification data and mapping data, the mapping data indicating whether or not each of a plurality of predefined mirror mapping operations are to be performed for the encoded normal component, and decoding the normal component, wherein the residual data are added to the predictor according to said predictor identification data, and the resulting normal component is mapped according to said predefined mirror mapping operations.

In one embodiment of the decoding method, the mapping data comprises cluster identification data for the normal component, and cluster mapping data for each cluster. The cluster identification data associates the normal component with a cluster. The cluster mapping data relates to a particular cluster and indicates whether or not each of a plurality of predefined mirror mapping operations are to be performed for normal elements being associated with the particular cluster.

According to one aspect of the invention, an apparatus for encoding normal components of a 3D mesh model, wherein a normal component is definable by its position on a unit sphere, comprises first clustering means for clustering the normal components of the 3D mesh model, wherein one or more first clusters are obtained and each normal component is an element of at least one of said first clusters, determining means for determining for each of the first clusters of normal components a sphere sector to which a majority of its elements belong, wherein a sphere sector is obtainable by dividing a sphere into m equal spherical segments and dividing each of said spherical segments into n equal sectors, mapping means for mapping normal components, which according to the determining are not in a pre-defined of said sectors, into the predefined sector, second clustering means for re-clustering the normal components, wherein one or more second clusters are obtained and each normal component is an element of at least one of said second clusters, a quantizer for quantizing the normal components, a predictive coder for determining for each of said second clusters a representative predictor element and determining residuals for the normal components, wherein a residual is the difference between a normal component and its respective predictor element, and an encoder for encoding a normal component by its residual, a reference to its predictor element and data indicating which of said mirror mapping operations were performed. Additionally, an entropy encoder may be used afterwards.

According to one aspect of the invention, an apparatus for decoding normal components of a 3D mesh model from an encoded bitstream, wherein a normal component is definable by its position on a unit sphere, comprises first extracting means for extracting from the encoded bitstream data of a normal component being a predictor, and second extracting means for extracting an identifier for the predictor, third extracting means for extracting from the encoded bitstream data relating to an encoded normal component, the data comprising residual data, predictor identification data and mapping data, the mapping data indicating whether or not each of a plurality of predefined mirror mapping operations are to be performed for the encoded normal component, and decoding means for decoding the normal component, wherein the residual data are added to the predictor according to said predictor identification data, and the resulting normal component is mapped according to said predefined mirror mapping operations.

In one embodiment of the apparatus for decoding, the apparatus comprises means for extracting from the mapping data cluster identification data for the normal component, and cluster mapping data for each cluster. The cluster identification data associates the normal component with a cluster. The cluster mapping data relates to a particular cluster and indicates whether or not each of a plurality of predefined mirror mapping operations are to be performed for normal elements being associated with the particular cluster. In this embodiment, the apparatus for decoding further comprises mapping means for mapping the normal component according to the predefined mirror mapping operations.

According to one aspect of the invention, a data structure comprises vertex data and encoded vertex orientation data of a 3D mesh model, wherein the encoded vertex orientation data comprise at least a predictor, an identifier associated with the predictor, and data relating to an encoded vertex orientation, and wherein the data relating to an encoded vertex orientation comprises residual data, predictor identification data, and mapping data, the mapping data indicating whether or not each of a plurality of predefined mirror mapping operations are to be performed for decoding the encoded vertex orientation.

In one embodiment of the data structure, the mapping data comprises cluster identification data for the vertex orientation, and cluster mapping data for each cluster, wherein the cluster identification data associates the vertex orientation with a cluster, and wherein the cluster mapping data relates to a particular cluster and indicates whether or not each of a plurality of predefined mirror mapping operations are to be performed for vertex orientations being associated with the particular cluster.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 segmentation of a unit sphere.

DETAILED DESCRIPTION OF THE INVENTION

Figure 1:
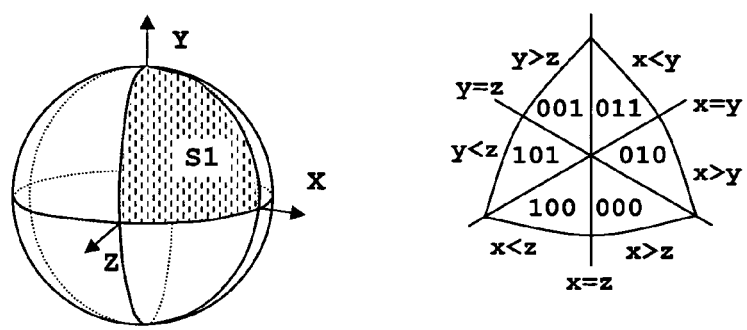

FIG. 1 shows the sectors of a unit sphere, on which the unit normals lie. A sphere sector is obtainable by dividing a sphere into m equal spherical segments S1 and dividing each of said spherical segments into n equal sectors 000, ..., 101. For simplicity, the dividing of a sphere into spherical segments can be done along the three Cartesian X, Y and Z axes, so that $2^3=8$ segments result. Other methods for dividing are possible, e.g. similar to FIG. 9.

Mapping between the m sectors and n segments can comprise up to $int(\log_2(m)+\log_2(n)+1)$ mirror mapping operations. For example, for eight segments S1 and six sectors 000, ..., 101 there result 3 mapping operations among segments, so that most (mainly all) of the normals are mapped into a single predefined segment, and another 3 mapping operations within the predefined segment so that most (mainly all) of the normals are mapped into a single predefined sector 000.

Preferably, the normals are mapped not one-by-one, but the normals are clustered before the mapping in a first clustering step. This clustering step may use k-means clustering. Its purpose is to simplify the mapping, since the same mapping is performed to all normals of a cluster. Different clusters may (but need not) use different mappings, which means different combinations of the available mappings.

It is advantageous to perform another clustering after the mapping, since usually after the mapping the normals are closer together. Therefore usually new, bigger clusters will result. This second clustering is also called re-clustering herein. The previous, first clustering was only used for the mapping. After the re-clustering, a representative normal is determined (using known methods for finding a representative in a cluster), and normals are encoded relative to the representative of their cluster (i.e. second cluster), so that the representative is a predictor. In encoding the normals, each normal needs to have information about its representative predictor, its prediction error (residual) and its mapping. From the representative predictor and the residual, the normal can be reconstructed, and from the mapping information its original position can be determined. The mapping information can be encoded in terms of a cluster identifier of the first clustering, and cluster mapping information for all normals of the cluster. This has the advantage that the mapping information needs to be encoded, transmitted and decoded only once for all cluster elements.

Figure 5:
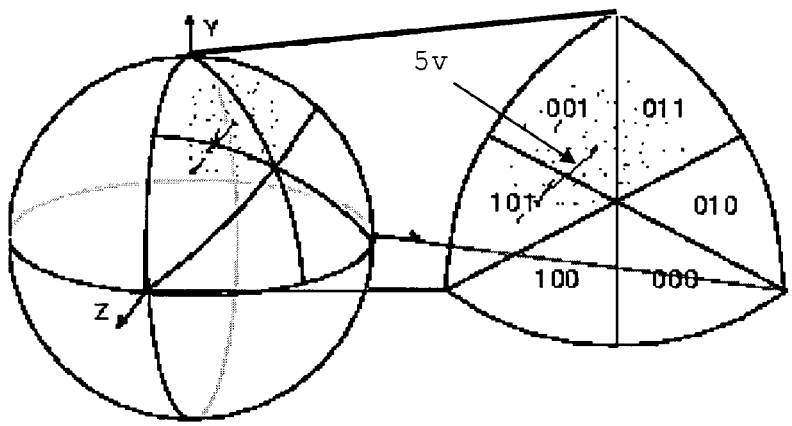
FIG. 5 cluster representatives after first clustering, mapping and re-clustering.
Figure 6:
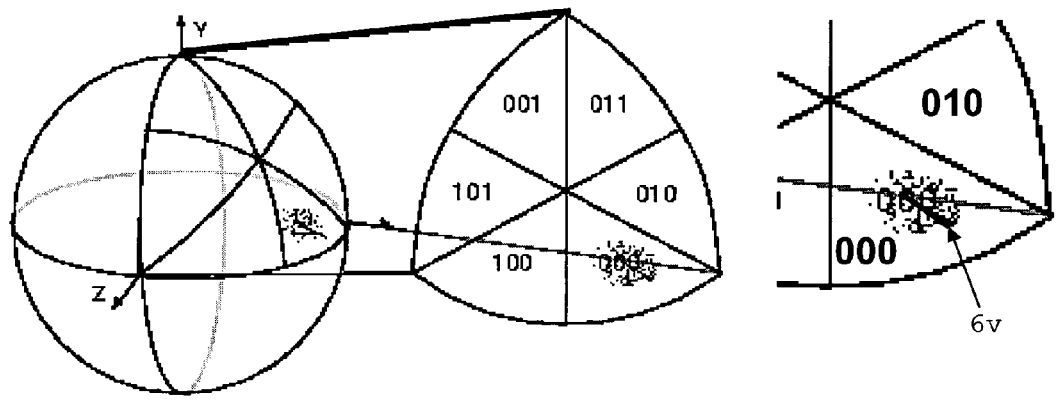
FIG. 6 the maximum error between orientations and mean orientation (a) before mapping and (b) after mapping.

This invention disclosure proposes an efficient method to compress orientations, which can combine the power of mapping operation and adaptive k-means clustering method. Our algorithm can adaptively decide whether to use mapping operation. First, all the orientations are clustered using an adaptive k-means clustering method, which is very efficient. Second, it is judged whether those clusters need to be mapped. For those clusters which have data points distributed in different sextants, we will do mapping operation. The mapping operation will map the orientation axes to the 1/48 sphere label with label 000. After mapping, the variance of those clusters can be reduced due to all data mapped into the same sextant and we can quantize them with fewer bits to further improve the compression ratio, as shown in FIG. 5 and FIG. 6. Then, all the orientation axes fallen into the "000" 1/48 sphere parts and all its adjacent 1/48 sphere parts are re-clustered using the adaptive k-means clustering method. For the orientation axes still falling into other 1/48 sphere parts, they need not to be re-clustered.

FIG. 5 shows the maximum error 5v between orientations and mean orientation of the first clusters before the mapping. FIG. 6 shows the maximum error 6v between orientations and mean orientation of the first clusters after the mapping and re-clustering. As can be seen, the maximum error is much smaller than before the mapping and re-clustering.

Orientations of a model can be efficiently represented by two axes. The first axis has two degrees of freedom and the second axis has only one degree of freedom. Our approach can also be used for compressing the second axis. The only difference is that the second axis distributes on a circle.

An orientation axis will be predicted by the representative of the (second) cluster it falls into. The prediction error, or residual, will be quantized.

Figure 4:
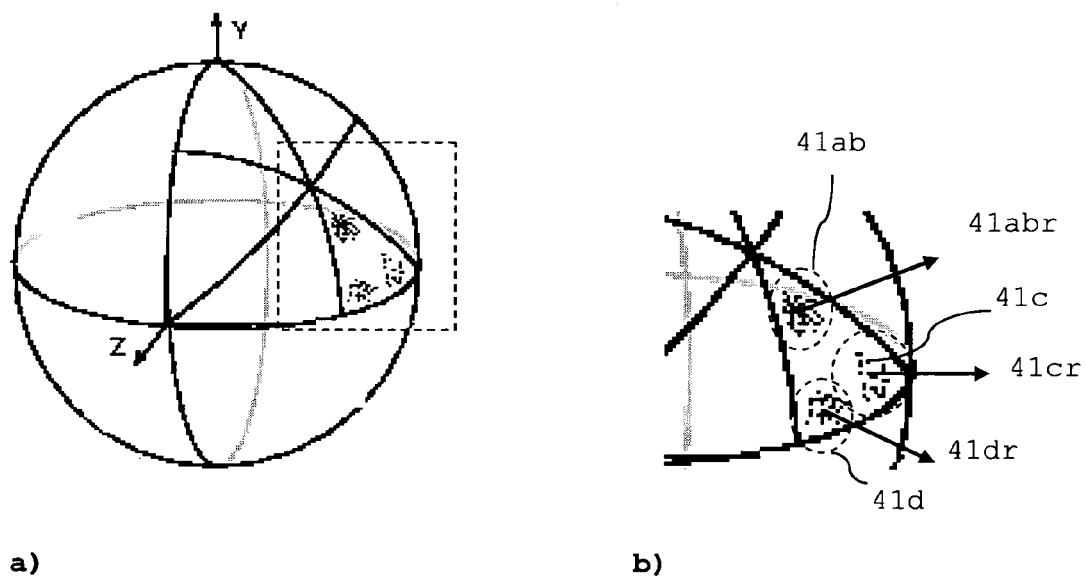
FIG. 4 distribution of the orientation axes on a unit sphere after clustering and mapping.

Due to the mapping operation, the variance of clusters of normal can be greatly reduced, as shown in FIG. 4.

Figure 7:
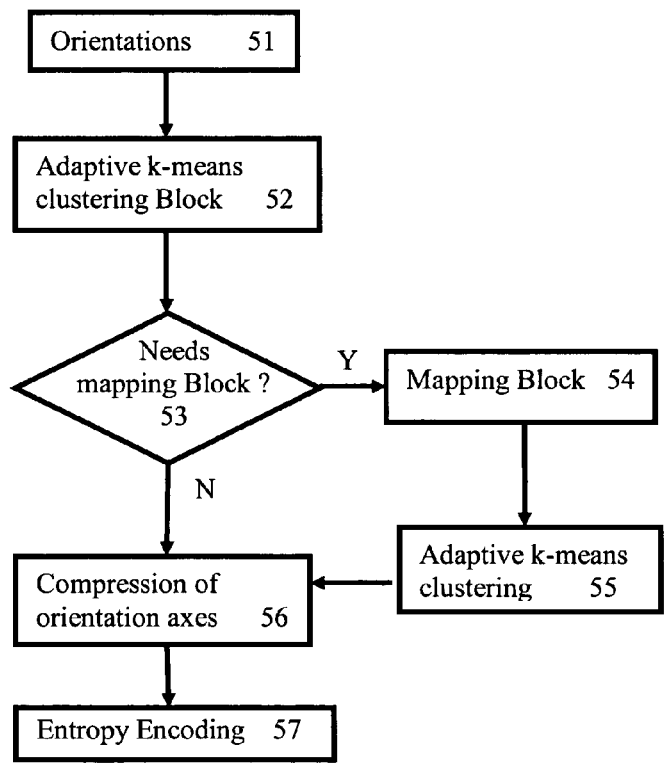
FIG. 7 a block diagram of encoding.
Figure 8:
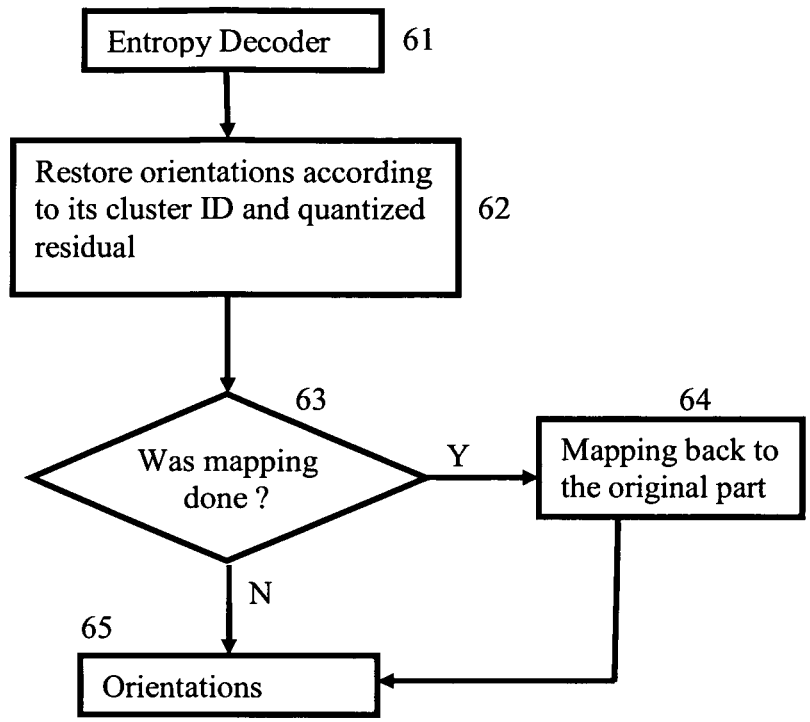
FIG. 8 a block diagram of decoding.

The block diagrams of encoder and decoder are shown in FIG. 7 and FIG. 8.

The "adaptive k-means clustering" block 52 performs as follows:
Initialization: n=0
(1) Set k as a small number, e.g. k=4.
(2) Classify the data set by k-means clustering.
(3) n=0;
(4) For each cluster.
If (the cluster's variance is bigger than $\alpha$) n++;
(5) if (n=0) END;
(6) For each cluster with variance bigger than $\alpha$
Separate the cluster into two by a 2-means clustering procedure.
(7) Goto (3).
Here $\alpha$ is a threshold. It may be fixed or user defined.

The decision block 53 checks each resultant cluster after the adaptive k-means clustering block 52. In a sector mapping block 54, the cluster that containing normals that fall into different "1/48 sphere" parts will be mapped to the "000" 1/48 sphere (which is in this example the predefined target sector).

In one embodiment, the bitstreams of compressed orientation axes information include two parts:
Some bits to indicate the number of clusters.
For each cluster:
Some floating-point values to indicate its representative.
Some bits to indicate the number of bits used to quantize the residual of each orientation axis.
Some bits to show the number of the compressed orientation axes with mapping operation.
For each mapped orientation axis:
six bits to show the mapping procedure.
Some bits to show the ID of the cluster it belongs to.
Some bits to show the quantized residual.
Some bits to show the number of compressed orientation axes without mapping
For each orientation axis:
Some bits to show the ID of the cluster it belongs to.
Some bits to show the quantized residual.

In one embodiment, the number of the compressed orientation axis is encoded/transmitted since different clusters usually have different variances. The variances can be quantized by different numbers of bits. So in this embodiment we indicate the number of bits which are used to quantize the residual of each normal component. Also some bits to show the "number of compressed orientation axes without mapping" for each mapped normal component are included in this embodiment. This is because in this case we need to know the number of compressed orientation axes with mapping and without mapping. The reason is mainly that for the decompression, we must know the number of compressed axes, so that we can allocate space for them.

In one embodiment, a method for encoding normal components of a 3D mesh model comprises steps of clustering the normal components of the 3D mesh model, wherein one or more first clusters are obtained and each normal component is an element of at least one of said first clusters, determining for each of the first clusters of normal components a sphere sector to which a majority of its elements belong, wherein a sphere sector is obtainable by dividing a sphere into m equal spherical segments and dividing each of said spherical segments into n equal sectors, mapping normal components, which according to the determining are not in a pre-defined of said sectors, into the predefined sector, wherein the mapping comprises up to int $(\log_2(m)+\log_2(n)+1)$ mirror mapping operations, re-clustering the normal components, wherein one or more second clusters are obtained and each normal component is an element of at least one of said second clusters, quantizing the normal components, determining for each of said second clusters a representative predictor element, determining residuals for the normal components, a residual being the difference between a normal component and its respective predictor element, and encoding a normal component by its residual, a reference to its predictor element and data indicating which of said mirror mapping operations were performed.

In one embodiment, the first and/or the second clustering operation uses adaptive k-means clustering.

In one embodiment, the number of spherical segments is m=8 and the number of sectors within each segment is n=6. In one embodiment, said spherical segments are spherical triangles.

In one embodiment, the encoding method further comprises after said mapping the step of rotating the 3D mesh model, so that more elements of the mapped first clusters lie in said predefined sector.

In one embodiment, the representative predictor element of the second cluster is one of said normal components, which is an actual member of the cluster. In another embodiment, it is a virtual (non-existing) predictor element.

In one embodiment, the data indicating which of said mirror mapping operations were performed comprises data identifying to which first cluster the normal component belongs, and mapping indication data indicating which of said mirror mapping operations were performed for the first cluster.

In one embodiment, the data indicating which of said mirror mapping operations were performed comprises data defining the dividing of a sphere into m equal spherical segments and the dividing each of said spherical segments into n equal sectors.

In one embodiment, a method for decoding normal components of a 3D mesh model from an encoded bitstream comprises steps of extracting from the encoded bitstream data of a normal component being a predictor, and extracting an identifier for the predictor, extracting from the encoded bitstream data relating to an encoded normal component, the data comprising residual data, predictor identification data and mapping data, the mapping data indicating whether or not each of a plurality of predefined mirror mapping operations are to be performed for the encoded normal component, and decoding the normal component, wherein the residual data are added to the predictor according to said predictor identification data, and the resulting normal component is mapped according to said predefined mirror mapping operations.

In one embodiment of the decoding method, the mapping data comprises cluster identification data for the normal component, and cluster mapping data for each cluster, wherein the cluster identification data associates the normal component with a cluster, and wherein the cluster mapping data relates to a particular cluster and indicates whether or not each of a plurality of predefined mirror mapping operations are to be performed for normal elements being associated with the particular cluster.

In one embodiment, the decoding method further comprises the step of extracting mirror operation data from the bitstream, wherein said predefined mirror operation is defined by the mirror operation data.

In one embodiment, an apparatus for encoding normal components of a 3D mesh model comprises modules that correspond to the function blocks shown in FIG. 7.

In one embodiment, an apparatus for decoding normal components of a 3D mesh model comprises modules that correspond to the function blocks shown in FIG. 8.

In one embodiment, a data structure comprises vertex data and encoded vertex orientation data of a 3D mesh model, wherein the encoded vertex orientation data comprise at least a predictor, an identifier associated with the predictor, and data relating to an encoded vertex orientation, and wherein the data relating to an encoded vertex orientation comprises residual data, predictor identification data, and mapping data, the mapping data indicating whether or not each of a plurality of predefined mirror mapping operations are to be performed for decoding the encoded vertex orientation.

In one embodiment of the data structure, the mapping data comprises cluster identification data for the vertex orientation, and cluster mapping data for each cluster, wherein the cluster identification data associates the vertex orientation with a cluster, and wherein the cluster mapping data relates to a particular cluster and indicates whether or not each of a plurality of predefined mirror mapping operations are to be performed for vertex orientations being associated with the particular cluster.

The invention is in principle advantageous for all realistic 3D mesh models. The invention is particularly advantageous for 3D mesh models that have their normals distributed not evenly. The more vertices the 3D mesh model has (i.e. the larger the model is), the more effective is the invention. Also, the more first clusters of normals a model has, the more effective is the invention, since after mapping the resulting second clusters will be larger.

Figure 2:
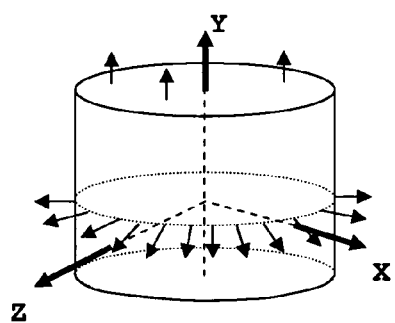
FIG. 2 orientation axes of a 3D mesh model being a cylinder.

FIG. 2 shows exemplarily the orientation axes of a 3D mesh model which has a cylindrical form. As can be seen, normals are distributed around the XY plane in all directions, but in the XY plane only in two directions, namely up and down. Thus, the normals at least of the XY plane may easily be clustered, and bits may be saved in their encoding. In one embodiment, the disclosed encoding method for normals is used for only some, but not all normals of a 3D mesh model.

Figure 3:
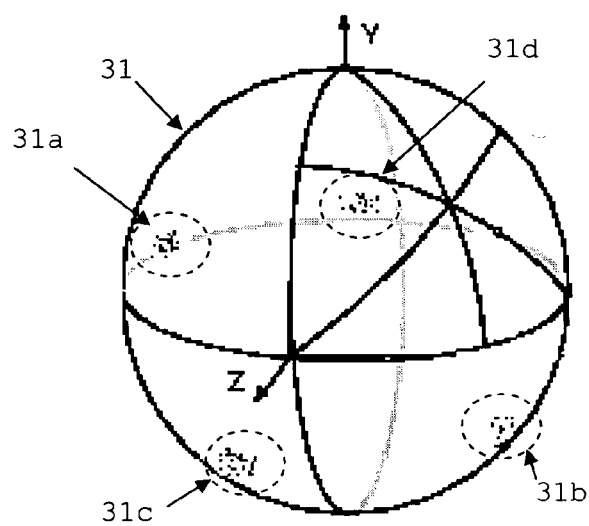
FIG. 3 distribution of orientation axes of an exemplary 3D mesh model on a unit sphere.

FIG. 3 shows the positions of the orientation axes of another exemplary 3D mesh model. According to the model shape, the normals are positioned in groups 31a-31d on a unit sphere 31.

Each of the groups can be clustered, and each cluster is mapped to the predefined target segment and sector, unless it is already in the target segment or sector. If a cluster is already in the target segment, it is sufficient to perform only the sector mapping. Still it needs to be encoded/decoded whether or not each mapping step needs to be performed. E.g. the encoding and mapping information FIG. 4 shows the distribution of the orientation axes on a unit sphere after clustering and mapping. As can be seen, two of the clusters 31a,31b of FIG. 3 have been mapped to the same area. Therefore a new cluster 41ab is generated in the re-clustering step. All elements of this new cluster 41ab can be predicted from the cluster representative 41abr, which serves as a predictor for the new cluster.

Figure 10:
FIG. 10 an exemplary 3D model of a candelabra light, the distribution of first orientation axes of its connected components and the distribution of the first orientation axes after mapping.
Figure 10:
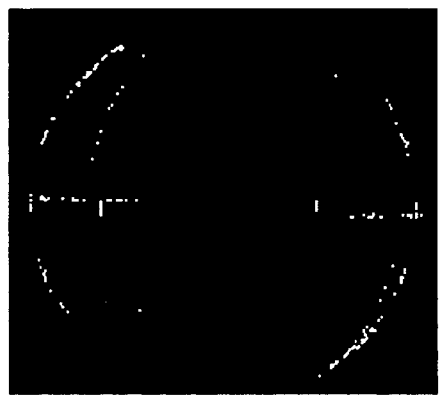
Figure 10:
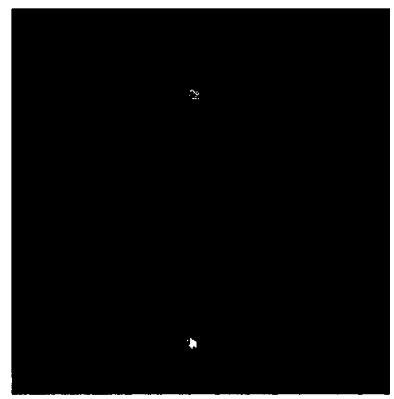

FIG. 10 shows an exemplary 3D model of a candelabra light, which comprises lots of cylindrical connected components. Each of them has a normal distribution like the model in FIG. 2. FIG. 10 b) shows the distribution of first orientation axes of the model. It can be seen that the orientation axes of the connected components dominate, since many orientation axes lie on a circle. FIG. 10 c) shows the distribution of the first orientation axes after mapping. As can be seen, mainly only two clusters remain that are very dense, and therefore can advantageously be encoded using prediction.

The invention can also be applied to any scenario regarding compression of orientation axes/normals of connected components (which are only parts of complete 3D models) as well as orientation axes/normals of complete 3D models.

Figure 9:
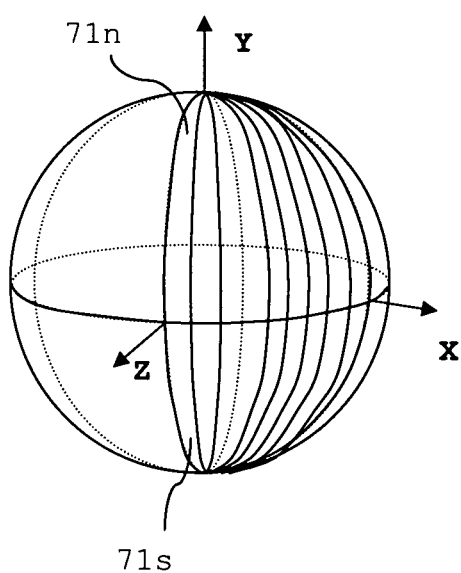
FIG. 9 an alternative segmentation method for unit spheres.

It should be noted that other types of unit sphere segmentation may be constructed other than a shown in FIG. 1, as would be apparent to those of ordinary skill in the art, all of which are contemplated within the spirit and scope of the invention. FIG. 9 shows one of several alternative possibilities, where each of 8 sectors is separated into several slices 71n,71s.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. Further, all embodiments, unless obviously contradicting each other, can be freely combined. It is expressly intended that all combinations of those elements that perform substantially the same function in substantially the same way to achieve the same results are within the scope of the invention.

Substitutions of elements from one described embodiment to another are also fully intended and contemplated.

It will be understood that the present invention has been described purely by way of example, and modifications of detail can be made without departing from the scope of the invention.

Each feature disclosed in the description and (where appropriate) the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

The invention claimed is:

1. A method for encoding normal components of a 3D mesh model, wherein a normal component is definable by its position on a unit sphere, the method being performed by an encoder having a hardware processor and integrated memory, the method comprising:
   clustering, using the processor, the normal components of the 3D mesh model, wherein one or more first clusters are obtained and each normal component is an element of at least one of said first clusters;
   determining for each of the first clusters of normal components a sphere sector to which a majority of its elements belong, wherein a sphere sector is obtainable by dividing a sphere into m equal spherical segments and dividing each of said spherical segments into n equal sectors;
   mapping normal components, which according to the determining are not in a pre-defined of said sectors, into the predefined sector, wherein the mapping comprises up to $\text{int}(\log_2(m)+\log_2(n)+1)$ mirror mapping operations;
   re-clustering the normal components, wherein one or more second clusters are obtained and each normal component is an element of at least one of said second clusters;
   quantizing the normal components;
   determining for each of said second clusters a representative predictor element;
   determining residuals for the normal components, a residual being the difference between a normal component and its respective predictor element;
   encoding a normal component by its residual, a reference to its predictor element and data indicating which of said mirror mapping operations were performed; and
   transmitting the encoded normal components.

2. The method according to claim 1, wherein the first and/or the second clustering operation uses adaptive k-means clustering.

3. The method according to claim 1, wherein m=8 and n=6 and said spherical segments are spherical triangles.

4. The method according to claim 1, wherein said representative predictor element of the second cluster is one of said normal components.

5. The method according to claim 1, wherein the data indicating which of said mirror mapping operations were performed comprises data identifying to which first cluster the normal component belongs, and mapping indication data indicating which of said mirror mapping operations were performed for the first cluster.

6. The method according to claim 1, wherein the data indicating which of said mirror mapping operations were performed comprises data defining the dividing of a sphere into m equal spherical segments and the dividing each of said spherical segments into n equal sectors.

7. An apparatus for encoding normal components of a 3D mesh model, wherein a normal component is definable by its position on a unit sphere, comprising
   a processor and associated memory, said processor and memory being configured to;
   first cluster the normal components of the 3D mesh model, wherein one or more first clusters are obtained and each normal component is an element of at least one of said first clusters;
   determine for each of the first clusters of normal components a sphere sector to which a majority of its elements belong, wherein a sphere sector is obtainable by dividing a sphere into m equal spherical segments and dividing each of said spherical segments into n equal sectors;
   map normal components, which according to the determining are not in a pre-defined of said sectors, into the predefined sector;
   second re-cluster the normal components, wherein one or more second clusters are obtained and each normal component is an element of at least one of said second clusters;
   quantize the normal components;
   determine for each of said second clusters a representative predictor element and determining residuals for the normal components, wherein a residual is the difference between a normal component and its respective predictor element;
   encode a normal component by its residual, a reference to its predictor element and data indicating which of said mirror mapping operations were performed; and
   transmit the encoded normal components.

8. The apparatus according to claim 7, wherein the first and/or the second clustering operation uses adaptive k-means clustering.

9. The apparatus according to claim 7, wherein m=8 and n=6 and said spherical segments are spherical triangles.

10. The apparatus according to claim 7, wherein said representative predictor element of the second cluster is one of said normal components.

11. The apparatus according to claim 7, wherein the data indicating which of said mirror mapping operations were performed comprises data identifying to which first cluster the normal component belongs, and mapping indication data indicating which of said mirror mapping operations were performed for the first cluster.

12. The apparatus according to claim 7, wherein the data indicating which of said mirror mapping operations were performed comprises data defining the dividing of a sphere into m equal spherical segments and the dividing each of said spherical segments into n equal sectors.

* * * * *